Feb. 26, 1952  J. R. SHIELDS  2,586,871
COMPOSITE PRESSURE SEAL
Filed May 7, 1948
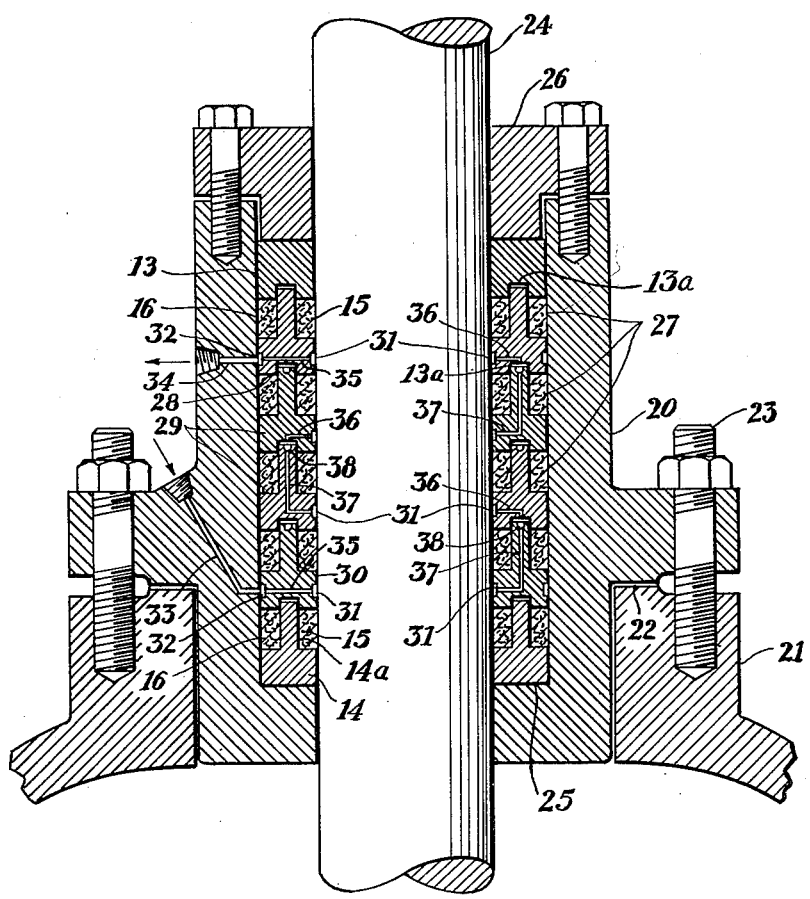
INVENTOR.
JAMES RODGER SHIELDS
BY
Wm Henry Venable
his Attorney Patented Feb. 26, 1952

2,586,871

UNITED STATES PATENT OFFICE 2,586,871

COMPOSITE PRESSURE SEAL

James Rodger Shields, Penn Township, Allegheny County, Pa.

Application May 7, 1948, Serial No. 25,622

3 Claims. (Cl. 286—27)

My seal may be constructed as gaskets or as packing for the sealing of stuffing boxes for pressure vessels such as autoclaves or the like. It is particularly useful for high-pressure applications, or where the gasket or packing is subjected to substantial loads or readily over-compressed in the installation thereof; being so constructed that, regardless of the axial loading, the radial pressure cannot exceed a prescribed and fixed maximum value at which the packing or gasket is most effective and stable, when assembled in an ordinary stuffing box of known and conventional types for high pressures.

A single gasket or section of my packing includes four parts, namely, an inner and an outer sealing ring of compressible material radially expansible under axial pressure against the casing wall and the shaft, and a pair of axially-opposed interlocking retainer rings of rigid material such as metal confining the sealing rings between them. A rigid annular web extends between the two sealing rings and enters a groove formed in at least one of them. This web may be conveniently integral with the other web or may, if desired, be a separate member. The groove in the retaining ring, which registers with the web, is of such depth that when the desired degree of compression is attained in the sealing rings for sealing in both sides of the gasket or packing section, the web is in abutment at the bottom of the groove, transmitting all excessive axial force directly to the opposite retaining ring, and preventing further deformation of the sealing rings. Ordinarily the web and groove would be centrally disposed in the packing section.

A plurality of such sections may be used in series, this being typical of stuffing-box applications especially. In this case, the rigid retaining rings and compressible sealing rings are alternated, the end retainers being substantially as above described and the intermediate retainers each including an annular web extension on one side and groove on the other. The entire series of rigid retainers thus interlock with one another and provide limited telescoping for compression of the packing rings between them to the correct degree for sealing under operating conditions; and the metal parts are preferably drilled and grooved providing passages for lubricating and cooling liquid to be circulated at spaced intervals in contact with the surface of the revolving shaft.

My composite sealing material will be more readily understood from the following description of a specific example with reference to the accompanying drawing in which is shown a transverse section of a stuffing box for the shaft of a turbine or agitator of a high pressure autoclave, the shaft packing being constructed according to my invention.

The accompanying figure illustrates an embodiment of my invention in a stuffing box for a rotatable shaft, which is otherwise of conventional construction. The stuffing box consists of an elongated casing 20 entered through the wall of the pressure vessel 21 and retained sealed therein against a conventional gasket 22 by a plurality of studs 23. A rotatable shaft 24 extends through the axial bore of the casing 20 which is closed by a shoulder 25 at the inner end and a packing gland 26 at the outer end, between which extremes the space between the shaft 24 and bore of the casing 20 is sealed by my composite packing 27.

Such packing extends for a substantial length along the shaft, and in principle the pressure drops by increments across successive increments of length of the packing, being generally at a maximum super-atmospheric pressure (or sub-atmospheric pressure if the vessel be under vacuum) at the inner end and at substantially atmospheric pressure at the outer end. To effect this, it is desirable that the lateral pressure of the packing against the shaft and casing be uniform and limited to some optimum value which renders lubrication not too difficult and generation of heat not excessive. This lateral pressure should preferably equal or exceed the unit pressure of the lubricant used in the stuffing box.

The packing 27 consists of an alternating series of rigid retaining rings made of relatively incompressible material such as steel, and rings of compressible packing material such as an asbestos fiber packing composition. The extreme outermost retaining ring 13 is provided with an annular groove 13a extending around its lower face. The extreme lowermost retaining ring 14 is provided with an annular web 14a projecting from its upper face. The intermediate retaining rings 28, 29 and 30 are substantially similar to one another each having the interlocking structure of both outer rings, that is, each of these rings has an outwardly extending web on one side and a groove oppositely disposed on the other, both in axial alignment so that the web of one ring registers with the groove of another; but these rings are machined somewhat specially for lubrication purposes, as will be presently described. Between the retaining rings are inserted sealing rings 15 and 16, made of suitable compressible packing material. The webs and grooves of the retaining rings are proportioned to limit the squeezing of the sealing rings to a predetermined maximum axial deformation when the packing is fully collapsed; and the gland 26 is preferably adjusted to compress the packing to some optimum greater length as shown by the drawing when the packing is first installed. The various corresponding parts may be dimensionally alike, so that the axial deformation of all the sealing rings, and therefore the lateral pressure thereof against the shaft and casing, is the same throughout the length of the stuffing box.

A most important consideration of stuffing box design is provision for lubrication and cooling. It is not uncommon that several horsepower is consumed in overcoming stuffing box friction, generating a corresponding amount of heat which must be dissipated in some way. Heat generation can be partly abated and cooling most effectively accomplished by circulating a flow of suitable liquid lubricant at the shaft surface. This is easily accomplished where my composite packing is used. As shown in the drawing, the sealing rings 28 and 30 have circumferential channels 31, 32 machined on the inner and outer faces respectively. The outer channels provide passages for lubricant fluid entering and leaving the packing, being in register with the lubricant inlet passage 33 and outlet passage 34 drilled in the casing 20. The inner and outer channels 31 and 32 of rings 28 and 30 are connected at intervals by radial passages 35. There may be, for example, three such passages 35 spaced apart 120° in each ring. Between the passages 35 in the ring 28 are angle-shaped passages 36 connecting the inner channel 31 with the interlock groove 13a, and similarly in ring 30 there are angular passages 37 between the passages 35, connecting the inner channel 31 with an annular channel 38 machined in the end of the web. The two rings 29 each have a shaft-facing lubricant channel 31 and a connecting channel 38 turned therein, and alternately spaced angular passages 36 and 37. With the 120° spacing previously suggested, radial passages 35 in rings 28 and 30 will be diametrically opposite the passages 36 and 37 as shown in the drawing; and in the rings 29 the passages 36 and 37 will be diametrically opposite as shown. In the drawing, the rings are represented as being oriented so that the various passages appear in the section shown; but it is obvious that this orientation is immaterial to the operation of the device, the oil flowing around the channels 31, 32, and 38 from one passage to the next in series regardless of the angular position of one retaining ring with respect to the others.

Oil under pressure pumped into the inlet passage 33 is thus conducted to the outer channel 32 in the ring 30, flowing around to and thence through the three passages 35 to the inner channel 31 against the shaft 24. The oil there spreads out over the shaft surface, lubricating the adjacent sealing rings 15, and absorbing heat generated by friction; and enters the intermediately spaced passages 37 to the channel 38, from which it flows through the passages 36 to the channel 31 in the retaining ring 29 above. The oil leaves the channel through the three passages 37 in ring 29 to the distributing channel 38 in the web thereof, and thence flows to the lubricating channel 31 in the next ring 29 through the passages 36. The flow continues through the passages 37 and channel 38 in this retaining ring 29 to the passages 36, lubricating channel 31, radial passages 35, and outlet channel 32 in the ring 28; whence it leaves the casing through outlet passage 34. The oil circulating system including pump, reservoir, regulating valve and piping connected between the ends of passages 33 and 34 are not shown, as suitable circuits are well known in the art. It will be apparent that oil can thus be circulated under pressure through the several lubricating channels 31 in series at any rate of flow desirable for cooling and lubricating the shaft in the stuffing box, flowing through circumferential segments between inlet and outlet passages communicating with each channel 31, in heat exchange relation with the shaft surface. When the packing is compressed to the optimum extent as in the drawing, the feed and outlet channels 32 are at fixed spaced relation in the casing 20 and register with the passages 33 and 34 drilled therein. The grooves 32 may be of such width, however, that the upper one overlies the outlet 34 in both expanded or fully compressed condition of the packing 27, so as to provide some adjustment in the compression applicable to the sealing rings 15 and 16 without interfering with lubrication and cooling of the shaft.

While I have described but one example of my invention, it may be variously practiced in other structures coming within the scope of the following claims.

I claim:

1. Shaft packing for stuffing boxes of autoclaves and the like comprising a spaced series of inside sealing rings of compressible material adapted to seal against a shaft, a spaced series of outside sealing rings of compressible material adapted to seal against a stuffing box bore, rigid and inflexible annular webs disposed between and filling the annular space between said inside and outside sealing rings, and a series of rigid, imperforate, transverse retaining rings disposed adjacent the ends of the said webs and said inside and outside sealing rings, said retaining rings separating the said sealing rings axially and having an annular groove of limited depth, at least, on one side, said groove registering with and receiving one of said webs providing an imperforate packing collapsible axially by limited increments to compress said sealing rings to a predetermined amount equally along said shaft.

2. Shaft packing for stuffing boxes of autoclaves and the like comprising a spaced series of inside sealing rings of compressible material adapted to seal against a shaft, a spaced series of outside sealing rings of compressible material adapted to seal against a stuffing box bore, rigid and inflexible webs disposed between and filling the annular space between said inside and outside sealing rings, rigid and imperforate transverse retaining rings disposed adjacent the ends of said sealing rings and separating said sealing rings axially, said retaining rings having an annular groove of limited depth, on one side, at least, said groove registering with and receiving said web providing a predetermined collapsing of said packing axially to compress said sealing rings by equal predetermined increments, lubricating channels formed around the inside cylindrical surfaces of said retaining rings adjacent the shaft inserted through the packing, and lubricant supply passages drilled in each of said retaining rings and connecting said channels to a source of lubricant external of each such retaining ring for the flow of lubricant to said channels at spaced intervals along said shaft.

3. Shaft packing for stuffing boxes of autoclaves and the like comprising a spaced series of inside sealing rings of compressible material adapted to seal against a shaft, a spaced series of outside sealing rings of compressible material adapted to seal against a stuffing box bore, rigid and inflexible annular webs disposed between and filling the annular space between said inside and outside sealing rings, rigid and imperforate transverse retaining and lubricating rings disposed adjacent the ends of said sealing rings axially at spaced intervals along said shaft, said retaining and lubricating rings having an annular groove of limited depth on one side, at least, said groove registering with and receiving said web providing a predetermined collapsing of said packing axially to compress said sealing rings by equal predetermined increments, lubricating channels formed around the inside cylindrical surfaces of said retaining and lubricating rings adjacent the shaft inserted through said packing, and lubricant supply passages drilled in each of said retaining rings and each of said webs communicating to the several of said lubricating channels, said lubricant supply passages comprising a continuous serial lubricant path from channel to channel and connecting at the opposite ends of said serial lubricant path to a lubricant supply port and an outlet port, respectively, external of said packing, for the circulation of lubricant through said channels at spaced intervals along said shaft.

JAMES RODGER SHIELDS.

REFERENCES CITED

The following references are of record in the file of this patent:

UNITED STATES PATENTS

| Number | Name | Date |
| --- | --- | --- |
| 1,437,262 | Newkirk | Nov. 28, 1922 |
| 1,725,836 | Solberg | Aug. 27, 1929 |
| 2,364,133 | De La Roza | Dec. 5, 1944 |